United States Patent [19]
Brienza

[11] 3,822,379
[45] July 2, 1974

[54] RADIO FREQUENCY PULSE GENERATOR-CORRELATOR

[75] Inventor: Michael J. Brienza, Westport, Conn.

[73] Assignee: United Aircraft Corporation, East Hartford, Conn.

[22] Filed: Dec. 15, 1972

[21] Appl. No.: 315,715

[52] U.S. Cl............... 235/181, 250/199, 330/4.3, 343/100 CL, 350/150, 350/161
[51] Int. Cl........................ G06g 7/19, G02f 1/18
[58] Field of Search ............ 235/181; 350/149, 150, 350/160, 161; 250/199; 330/4.3

[56] References Cited
UNITED STATES PATENTS

| | | | |
|---|---|---|---|
| 3,383,627 | 5/1968 | Desmares............................ | 350/161 |
| 3,694,657 | 9/1972 | Brooks............................ | 235/181 X |
| 3,700,912 | 10/1972 | Glass et al. ........................ | 350/161 |
| 3,701,583 | 10/1972 | Hammond ......................... | 350/150 |
| 3,701,584 | 10/1972 | Runge................................ | 350/149 |
| 3,710,283 | 1/1973 | Alphonse............................ | 350/161 |
| 3,714,404 | 1/1973 | Hileman et al. .................... | 235/181 |

*Primary Examiner*—Felix D. Gruber
*Attorney, Agent, or Firm*—Anthony J. Criso

[57] ABSTRACT

A source of continuous wave laser energy interrogates an interaction medium into which a source of acoustic pulses in the radio frequency (RF) range is injected. A variably coded birefringence is induced in the medium to cause conditions of resonant backscattering of the laser energy in the form of coded pulses. The backscattered pulses are optically heterodyned with the laser energy to provide a pure RF signal having the coded characteristics. Signal correlation is accomplished by converting the coded RF electrical signal into an acoustic signal in the medium and creating a matched condition of coded birefringence in the medium thereby causing a condition of resonant scattering over the entire medium.

7 Claims, 2 Drawing Figures

RADIO FREQUENCY PULSE GENERATOR-CORRELATOR

BACKGROUND OF THE INVENTION

1. Field of Invention

The present invention relates to the generation and correlation of electric signals in the RF region and more particularly to means for producing RF signals which are continuously variable in frequency, amplitude and duration, as well as for correlating such signals.

2. Description of the Prior Art

There are various applications particularly in radar and communication systems which require the production of RF signals having programmable characteristics, and subsequent correlation of the signals for identification purposes. Many present radar systems generate coded pulses having specific amplitude, frequency and duration characteristics to provide an identifiable beam for target detection. The echo signals from a target illuminated by coded pulses are then passed through a matched filter which selectively identifies the coded pulses within the electronic background thereby providing information about the target. The versatility of such systems is limited by the inability to vary the specific characteristics of the coded pulses quickly and easily since the pulse generation system is usually fixed at the time of design. For example a surface wave acoustic correlator, sometimes referred to as a matched filter, has fixed pulse characteristics which are determined by the configuration of the input and output transducers formed on the correlator. Obviously, the ability to quickly and continuously vary the coding in a pulse generating system which has a correlation capability substantially enhances the invulnerability of the system to detection and surveillance.

SUMMARY OF THE INVENTION

An object of the present invention is to provide a source of programmable electric signals which has the capacity to both generate and correlate such signals over a range of radio frequencies. A further object of the invention is to produce a sequence of RF signals having variable frequency, amplitude and duration characteristics.

According to the present invention short electric pulses a few nanoseconds in duration are applied to an acoustic transducer to generate a similar acoustic pulse which is propagated along the axis of an optically anisotropic medium where it interacts with a continuous wave source of laser energy travelling in a colinear direction; simultaneous propagation of the acoustic signal and the laser energy generates a backscattered optical signal which is optically heterodyned with a portion of the laser energy to produce an RF signal having characteristics determined by the properties of the interaction medium. Since the characteristics of the medium can be altered relatively easily by subjecting it to such influences as a magnetic field, an electric field, a temperature gradient, or mechanical strains, the characteristics of the backscattered signal can be adjusted correspondingly. Any given output signal generated by the device is readily correlated by injecting the signal into the interaction medium as an acoustic signal while continuously interrogating the medium with the CW laser energy and observing the intensity of the subsequently scattered optical pulse from the medium; the degree of correlation between the signal reinserted into the medium in the original signal is determinable from the intensity of the scattered beam.

A primary advantage of the present invention is its overall simplicity and ability to rapidly and randomly program a source of coded RF electric signals. The system also acts as its own matched filter. The present invention may be used to form and shape pulses as well as to produce coded signals in the form of frequency and/or amplitude modulated pulses or bursts of pulses. The complete electronic system is easily adapted to a variety of radar and communications applications. The duration of the pulses produced by this device is limited by the length of the interaction medium and the frequency range is limited by the ability of the interaction medium to withstand the various magnetic, electric, temperature, and acoustic gradients to which it may be subjected. A further advantage of the present invention is its ability to combine several crystals in series to extend the duration of the coded output signals. The characteristics of the RF pulses produced with the present invention can be varied electronically by a variety of techniques.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
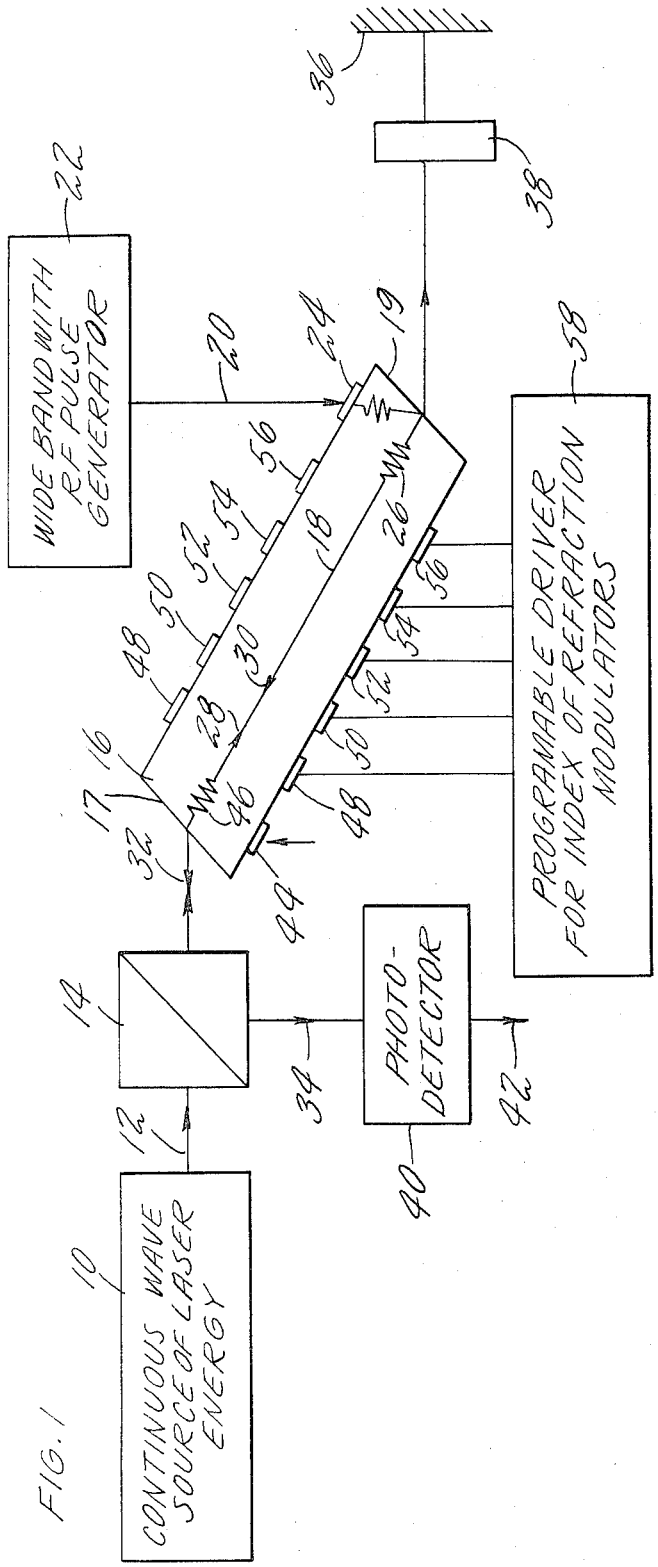
FIG. 1 is a schematic drawing of a variable RF pulse generator-correlator system.

A variable RF pulse generator-correlator in accordance with the present invention is shown schematically in the FIG. 1. A continuous wave laser 10 which produces a continuous beam 12 of input laser energy directs the laser energy through a polarizing beam splitter 14 and into an optically anisotropic medium 16 having a spacially programmable index of refraction. The polarized laser energy proceeds through the medium along an axis 18 which intercepts the optically upstream end surface 17 and the optically downstream end surface 19. A pulse 20 of RF energy produced by a wideband pulse generator 22 is applied to an input acoustic transducer 24. An acoustic signal 26 which is initiated in the medium at the transducer 24 and propagates along the axis 18, scatters the laser radiation travelling in a forward direction 28 one hundred eighty degrees to a reverse direction 30 which is colinear to that of the input laser radiation along the axis. The scattered radiation leaves the crystal along a path 32 and is directed away from the laser along a path 34 by the beam splitter 14. The portion of the input laser radiation not undergoing backscattering by the pulsed acoustic energy leaves the medium in the direction shown in FIG. 1 and is redirected back into the medium by a suitable reflector 36. A quarterwave plate 38 causes the reflected optical beam to undergo orthogonal polarization rotation in the round trip transit between the medium and the reflection surface. The backscattered radiation and the reflected portion of the optical beam which have identical polarization characteristics but frequency components which differ by the frequency components of the acoustic pulse in the medium associated with different scattering points in the medium, undergo optical heterodyning. The beam splitter directs the heterodyned optical signal to a photodetector 40 which provides an electric output signal 42 in the RF range. The actual frequency of the electric output signal is the difference between the frequency of the laser energy and the frequency of the radiation scattered by the acoustic signal. The frequency components of the heterodyned signal are also precisely the frequency components of the acoustic pulse 26 responsible for the scattering at each point in the medium.

For a given acoustic signal 26, the frequency variation of the electrical output signal 42 is a function of the optical birefringence of the medium. A nonuniform index of refraction in the medium causes a corresponding nonuniformity in the frequency of the output signal. For a given index of refraction profile spatially distributed in the acousto-optic medium, the time variation of the output signal is formed as the wideband acoustic pulse propagates through a particular region in the medium producing the frequency associated with the index of refraction at that particular point. Therefore the output pulse generated by the wideband short input acoustic pulse sweeping down the medium and scattering the laser energy has the various frequencies associated with the index of refraction in the medium at the specific point of scattering. For example, if the birefringence increases linearly from the optically upstream end surface 17 to the optically downstream end surface 19 of the interacting medium the resonant frequency for backscattering varies in a similar fashion; the output pulse is an RF signal, swept in frequency from the high resonant frequency associated with the index of refraction at the optical downstream end where the input transducer is located, to a lower resonant frequency associated with the opposite end of the medium as the acoustic pulse moves to the optical upstream end.

An RF pulse having frequency and amplitude characteristics determined by the index of refraction profile in the medium 16 can be provided with the procedure described above. The same apparatus can also be used to correlate this signal as well as similar signals generated by another means. To obtain signal correlation, the RF electric pulse is injected into the crystal 16 through a correlation transducer 44. A corresponding acoustic signal 46 is produced and travels along the axis 18 in the direction 28. When the acoustic signal 46 assumes the same spatial distribution which the acoustic signal 26 had when the scattered radiation was first produced, the pulse characteristics exactly match the medium characteristics and resonant conditions exist across the entire acoustic pulse. The correlation transducer is necessarily located at the opposite end of the medium at which the input transducer is located. Under the conditions of high correlation between the acoustic signal 46 and the spatial distribution of birefringence for resonant scattering, a high intensity pulse of backscattered optical laser energy occurs. This represents correlation of the output signal 42 with the original acoustic signal 26 and the apparatus acts as a perfectly matched filter.

The birefringence of the material is a measure of the difference between the ordinary and extraordinary indexes of refraction in the material. Since the index of refraction, the ratio of the local optical velocity and the free space speed of light, can be varied somewhat by applying an outside force by such means as a magnetic field, an electric field, a mechanical strain field or a temperature gradient to a material, the refractivity and in turn the birefringence of a material is readily varied. The use of any of the indicated means can modulate the spatial distribution of the birefringence in the interaction medium; further these means can produce an artificial birefringence in a suitable material not otherwise birefringent. For example, if a length of suitable material normally of uniform birefringence is subjected to a temperature gradient over this length, the material can exhibit a corresponding varying birefringence.

Figure 2:
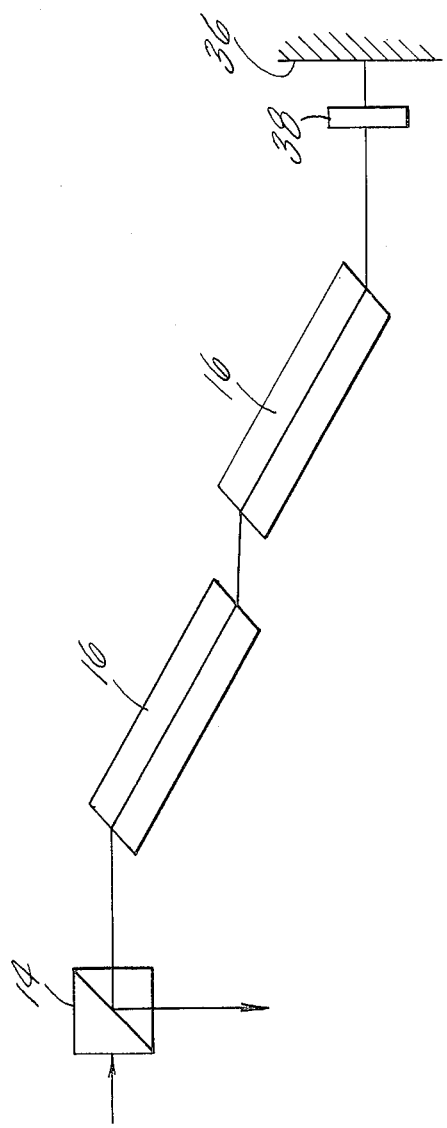
FIG. 2 is a schematic drawing of two interacting media in optical series in accordance with the present invention.

An attractive method of rapidly varying an index of refraction is to program a variation in an electric field along the length of the medium. The birefringence is a function of the electric field and therefore responds to variation in this applied field. Referring to FIG. 1, the medium is shown with several pairs 48–56 of electrodes adhered to the outer surface thereof. For further information on the operation of an optically anisotropic crystal such as is shown in FIGS. 1 and 2 see, for example, the following publications by Harris et al: Acousto-Optic Tunable Filter, Journal of the Optical Society of America, Vol. 59 No. 6, June 1969, p. 744; Electrically Tunable Acousto-Optic Filter, Applied Physics Letters, Vol. 15, No. 10, Nov. 1969, p. 325; and $CaMoO_4$ Electronically Tunable Optical Filter, Applied Physics Letters, Vol. 17, No. 5, Sept. 1970, p. 223. A programmable driver 58 provides a different voltage to each of the different pair of electrodes shown to provide a suitably different electric field to the portion of the medium sandwiched between the electrodes. The result, is a corresponding spatial variation in the birefringence exists in the medium. The medium is programmable in an analogous fashion by acoustic means whereby varying mechanical strain fields are applied although the speed at which changes between different programs of medium birefringence can be effected is reduced. When an acoustic signal passes through a suitable material, a mechanical strain is set up within the material and the local refractivity changes. Regardless of the means used to induce the refractivity change, the change can be made directionally preferential to effect only one index of refraction thereby maximizing the birefringence change caused by a given inducing mechanism. Also the input laser radiation which is continually interrogating the crystal must be polarized either as an ordinary or extraordinary wave prior to its injection into the crystal.

The initial acoustic signal formed by the input acoustic transducer can be longitudinal when produced and converted to a shear wave upon reflection at the surface of the medium 10 as shown in FIG. 1. This configuration allows the optical energy to enter and leave the interaction medium without interference with the acoustic transducers while maintaining the paths of both the acoustic and the optical wave colinear. The acoustic pulses are inserted into the medium and propagate as shown in a direction which is perpendicular to the axis at the medium until they are reflected off the end surface which is at a suitable angle to reflect the acoustic pulses in the axial direction. The acoustic shear wave travels along the axis 18 in a direction antiparallel to the direction of travel of the continuous wave laser energy. The acoustic wave, which can be either a shear or longitudinal wave, is capable of effecting laser beam scattering from one polarization to an orthogonal polarization, the latter being readily separated from the incident beam by the polarizing beam splitter. The original polarized laser beam is scattered when satisfying the condition $$K_o = K_e + K_a$$

where
$K_o$ is the wave vector of the ordinary ray of the input optical beam; (or output beam)
$K_e$ is the wave vector of the extraordinary ray of the output beam; (or input beam) and
$K_a$ is the wave vector of the acoustic signal.

The frequency, $f_s$, of the acoustic signal required to effect the scattering is given by $$f_s = (v_s/\lambda) \left| n_o - n_e \right|$$

where
$v_s$ is the acoustic propagation velocity;
$\lambda$ is the free space optical wavelength;
$n_o$ is the ordinary index of refraction; and
$n_e$ is the extraordinary index of refraction.

The resonant acoustic frequency at any point in the medium is the direct function of the birefringence which is the difference between ordinary and extraordinary indexes of refraction.

In naturally occurring birefringent materials which couple between orthogonal polarizations with acoustic wave interaction, the normal birefringence requires a resonant frequency which in the present matter is the center frequency of the acoustic pulse.

The input acoustic pulse must have a sufficient bandwidth to cover the total frequency range of the anticipated resonant interaction based on the range of birefringence programmed into the interaction medium. The spectral content of this pulse can be specifically tailored to produce a desired output RF pulse characteristic. An acoustic pulse sweeping through the interaction medium having an appropriate spatially programmed birefringence, backscatters the optical beam which it intercepts. The backscattered energy is in the form of a pulse which is orthogonally polarized with respect to the input optical beam and it is frequency shifted with respect to the input optical beams in an amount equal to the resonant acoustic frequency at the locations of the backscatterings. Thus, when the backscattered pulse is optically heterodyned with the portion of the laser input energy, an RF signal is formed having a frequency profile the same as the spatially determined resonant scattering condition in the interaction medium. The output RF pulse can be amplitude modulated by modulating the intensity of the input optical beam during the transit time of the input acoustic pulse. Alternatively the amplitude function can be applied electrically either at the detector or at succeeding electronic stages after the detector.

In materials which exhibit inherent birefringence, the frequency at which resonant backscattering occurs is at the center of the modulation bandwidth. Lithium niobate for example requires an input transducer operating at about 950 MHz, similarly calcium molybdenate requires a transducer having an operating range which is nominally 50–100 MHz.

Although the invention has been shown and described with respect to preferred embodiments thereof it should be understood by those skilled in the art that the foregoing and various changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for providing and correlating RF signals having variable frequency, duration and intensity characteristics comprising:
a source of continuous wave laser energy which provides an input beam of polarized laser radiation;
an acousto-optic interaction medium having a spatial distribution of birefringence along an axis therethrough and located in the paths of the input beam;

means for providing RF electric input pulses;
means fixedly attached to the medium for converting the electric input pulses into corresponding RF acoustic pulses which travel internal of the medium in the axial direction and scatter laser energy from the input beam as scattered optical pulses that are orthogonally polarized with respect to, and travel in the opposite direction from, the input beam;
means for causing heterodyning of the scattered optical pulses with radiation from the input beam;
means for converting the heterodyned signal into RF output electrical signals; and
means fixedly attached to the medium for converting the RF output electric pulses into corresponding acoustic pulses which travel internal of the medium in the axial direction.

2. The invention according to claim 1 further including means for varying the spatial distribution of birefringence along the axis of the medium.

3. The invention according to claim 1 wherein the means for converting the electric input pulses into acoustic pulses is located at the opposite end of the medium axis as is the means for converting the output electric signals into acoustic pulses.

4. Apparatus for providing RF signals having variable frequency, duration and intensity characteristics comprising:
a source of continuous wave laser energy which provides an input beam of polarized laser radiation;
an acousto-optic interaction medium having a spatial distribution of birefringence along an axis therethrough and located in the path of the input beam;

means for providing RF electric input pulses;
means fixedly attached to the medium for converting the electric input pulses into corresponding RF acoustic pulses, which travel internal of the medium in the axial direction and scatter laser energy from the input beam as scattered optical pulses that are orthogonally polarized with respect to, and travel in the opposite direction from, the input beam;
means for causing heterodyning of the scattered optical pulses with radiation from the input beam; and means for converting the heterodyned signals into RF output electrical signals.

5. The invention according to claim 4 further including means for varying the spatial distribution of birefringence along the axis of the medium.

6. Apparatus for correlating electric RF signals having various frequency, duration and intensity characteristics with known RF signals comprising:
  a source of continuous wave laser energy which provides an input beam of polarized laser radiation;
  an acousto-optic interaction medium having a spatial distribution of birefringence along an axis therethrough and located in the path of the input beam;
  means for converting the electric RF signals to be correlated into corresponding acoustic pulses which travel internal of the medium in the axial direction and scatter laser energy from the input beam as scattered optical pulse that are orthogonally polarized with respect to, and travel in the opposite direction from, the input beam;
  means for causing heterodyning of the scattered optical pulses with radiation from the input beam; and
  means for converting the heterodyned signals into RF output electrical signals.

7. The invention according to claim 6 further including means for varying the spatial distribution of birefringence along the axis of the medium.

* * * * *